(12) United States Patent
Bellac et al.

(10) Patent No.: US 6,941,759 B2
(45) Date of Patent: *Sep. 13, 2005

(54) SOLAR POWER ENHANCED COMBUSTION TURBINE POWER PLANTS AND METHODS

(75) Inventors: Alphonse H. Bellac, Old Lyme, CT (US); Ronald Destefanis, Jackson Heights, NY (US)

(73) Assignee: Jasper Energy Development LLC, Harrison, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/302,217

(22) Filed: Nov. 22, 2002

(65) Prior Publication Data

US 2003/0074901 A1 Apr. 24, 2003

Related U.S. Application Data

(60) Division of application No. 09/383,671, filed on Aug. 26, 1999, now Pat. No. 6,484,506, which is a division of application No. 08/969,121, filed on Nov. 12, 1997, now Pat. No. 6,000,211, which is a continuation-in-part of application No. 08/878,155, filed on Jun. 18, 1997, now abandoned.

(51) Int. Cl.[7] ............................................... F02L 7/141
(52) U.S. Cl. ........................................ 60/772; 60/728
(58) Field of Search .................. 60/772, 728; 62/238.3, 62/476

(56) References Cited

U.S. PATENT DOCUMENTS

| 2,660,521 A | 11/1953 | Teichmann |
| 2,942,411 A | 6/1960 | Huchings |
| 3,693,347 A | 9/1972 | Kydd et al. |
| 4,023,948 A | 5/1977 | Pitts et al. |
| 4,055,948 A | 11/1977 | Kraus et al. |

(Continued)

OTHER PUBLICATIONS

Brown, D.R., Katipamula, S. and Konynenbelt, J.H., 1996. "The Impact of Climate on the Economics of Combustion Turbine Inlet Air Cooling", Pacific Northwest Laboratory, Richland, Washington.

"Baltimore AirCoil and Henry Vogt Machinery Thermal Storage Technology for CT Inlet Air Cooling," 1995, Baltimore AirCoil Brochure.

Kearney, D., Washom, B. and Dracker, R., 1997. "ISCS Parabolic Trough Facilities for Mexico—A Pre–Feasibility Study".

"Status Report on Solar Thermal Power Plants", 1996. Pilkington Solar International.

*Primary Examiner*—Charles G. Freay
(74) *Attorney, Agent, or Firm*—Cowan, Liebowitz & Latman, P.C.; Eugene L. Flanagan, III

(57) ABSTRACT

Combustion turbine power plants and methods of operating the same are provided in which air is cooled using solar energy and supplied to an air inlet of the power plant to support combustion. Also, combustion turbine power plants and methods of operating the same are provided in which steam is produced using solar energy and injected into a turbine of the power plant.

7 Claims, 7 Drawing Sheets

U.S. PATENT DOCUMENTS

| | | |
|---|---|---|
| 4,068,474 A | 1/1978 | Dimitroff |
| 4,164,123 A | 8/1979 | Smith |
| 4,167,856 A | 9/1979 | Seidel et al. |
| 4,173,994 A | 11/1979 | Hiser |
| 4,205,529 A | 6/1980 | Ko |
| 4,213,303 A | 7/1980 | Lane |
| 4,248,049 A | 2/1981 | Briley |
| 4,259,836 A | 4/1981 | Finckh |
| 4,259,837 A | 4/1981 | Russell et al. |
| 4,261,176 A | 4/1981 | Theyse |
| 4,262,484 A | 4/1981 | Jubb et al. |
| 4,302,949 A | 12/1981 | Trimboli Longhetto |
| 4,313,304 A | 2/1982 | Hunt |
| 4,327,555 A | 5/1982 | Dimon |
| 4,353,207 A | 10/1982 | Lee |
| 4,358,929 A | 11/1982 | Molivadas |
| 4,400,946 A | 8/1983 | Oplatka |
| 4,446,700 A | 5/1984 | Bronicki et al. |
| 4,509,333 A | 4/1985 | Nussdorfer et al. |
| 4,512,336 A | 4/1985 | Wiener |
| 4,848,087 A | 7/1989 | Parker et al. |
| 4,942,736 A | 7/1990 | Bronicki |
| 4,986,079 A | 1/1991 | Koseki et al. |
| 5,123,247 A | 6/1992 | Nelson |
| 5,203,161 A | 4/1993 | Lehto |
| 5,307,802 A | 5/1994 | Placek |
| 5,353,597 A | 10/1994 | Faulkner et al. |
| 5,417,052 A | 5/1995 | Bharathan et al. |
| 5,442,908 A | 8/1995 | Briesch et al. |
| 5,444,971 A | 8/1995 | Holenberger |
| 5,444,972 A | 8/1995 | Moore |
| 5,448,889 A | 9/1995 | Bronicki |
| 5,457,951 A | 10/1995 | Johnson et al. |
| 5,479,783 A | 1/1996 | Uchida |
| 5,537,813 A | 7/1996 | Davis et al. |
| 5,540,045 A | 7/1996 | Corbett et al. |
| 5,623,822 A | 4/1997 | Schuetzenduebel et al. |
| 5,632,147 A | 5/1997 | Greer |
| 5,632,148 A | 5/1997 | Bronicki et al. |
| 5,655,373 A * | 8/1997 | Yamashita et al. ............ 60/728 |
| 5,666,818 A * | 9/1997 | Manrique-Valadez ...... 62/235.1 |
| 5,697,207 A | 12/1997 | Cromer et al. |
| 5,758,502 A * | 6/1998 | Utamura et al. ............. 60/728 |
| 5,778,675 A | 7/1998 | Nakhamkin |
| 5,790,972 A | 8/1998 | Kohlenberger |
| 6,000,211 A * | 12/1999 | Bellac et al. ................. 60/775 |
| 6,484,506 B1 * | 11/2002 | Bellac et al. ................. 60/772 |

* cited by examiner

SOLAR POWER ENHANCED COMBUSTION TURBINE POWER PLANTS AND METHODS

This application is a divisional of application Ser. No. 09/383,671, filed Aug. 26, 1999 now U.S. Pat. No. 6,484, 506, which is a divisional application Ser. No. 08/969,121 filed Nov. 12, 1997, now U.S. Pat. No. 6,000,211, which is a continuation-in-part of application Ser. No. 08/878,155, filed Jun. 18, 1997 ABANDONED.

BACKGROUND

The present invention relates to combustion turbine power plants utilizing solar energy to increase their capacity and efficiency.

Combustion turbine power plants can be brought on line quickly to meet peak demands for electric power. The demand for power in warmer climates generally is greater during the day when temperatures are higher and solar energy is available.

Various schemes have been proposed, therefore, for making use of solar energy in a combustion turbine power plant for improving its heat rate (fuel usage per unit electric energy output, typically measured in Btu's per kWh) and/or its power capacity, to reduce the cost of supplying electric power to satisfy peak demand. For example, it has been proposed to utilize solar energy to heat air supplied from the turbine's air compressor before it is introduced into its combustion chamber.

This scheme has several serious drawbacks which result in reduced plant capacity and efficiency. Heating the inlet air to the combustor of a gas turbine decreases the air's density, which reduces the power output. More serious constraints on gas turbine output are imposed by the strict temperature limits which must be observed to avoid premature failure of critical components. Increasing inlet air temperature requires a concomitant decrease in the rate at which air and fuel are supplied to the gas turbine in order to avoid exceeding such temperature limits, resulting in reduced power output. However, gas turbine parasitic losses increase as a percentage of gross output when the latter decreases, leading to higher specific fuel consumption. This proposal if implemented, therefore, would not serve its intended purpose.

Another scheme would add heat to combustion gases by means of solar energy. However, the solar energy collection system would then need to operate at very high temperatures and pressures, since it would need to augment the energy content of combustion gases which are already at high temperature and pressure. The solar collection system thus would require a high capital investment, and would suffer large parasitic heat losses due to the high temperatures at which it would operate.

SUMMARY

In accordance with one aspect of the present invention, a combustion turbine power plant comprises a combustion turbine having an opening to receive inlet air, and means for cooling the inlet air using solar energy.

In accordance with another aspect of the present invention, a method of operating a combustion turbine power plant comprises supplying fuel to a combustion turbine power plant, supplying air which has been cooled using solar energy to an air inlet of the power plant, mixing the air received at the air inlet with the fuel to produce an air/fuel mixture, burning the air/fuel mixture to form combustion gas, and supplying the combustion gas to a turbine of the power plant.

In accordance with a further aspect of the present invention, a combustion turbine power plant comprises a turbine having a port for injecting augmenting steam and means for producing the augmenting steam using solar energy.

In accordance with a still further aspect of the present invention, a method of operating a combustion turbine power plant comprises producing steam using solar energy, and injecting the solar energy produced steam into a turbine of the combustion turbine power plant.

The above, as well as further features of the invention and advantages thereof, will be apparent in the following detailed description of certain illustrative embodiments thereof which is to be read in connection with the accompanying drawings forming a part hereof, and wherein corresponding parts and components are identified by the same reference numerals in the several views of the drawings.

DETAILED DESCRIPTION OF CERTAIN ADVANTAGEOUS EMBODIMENTS

Figure 1:
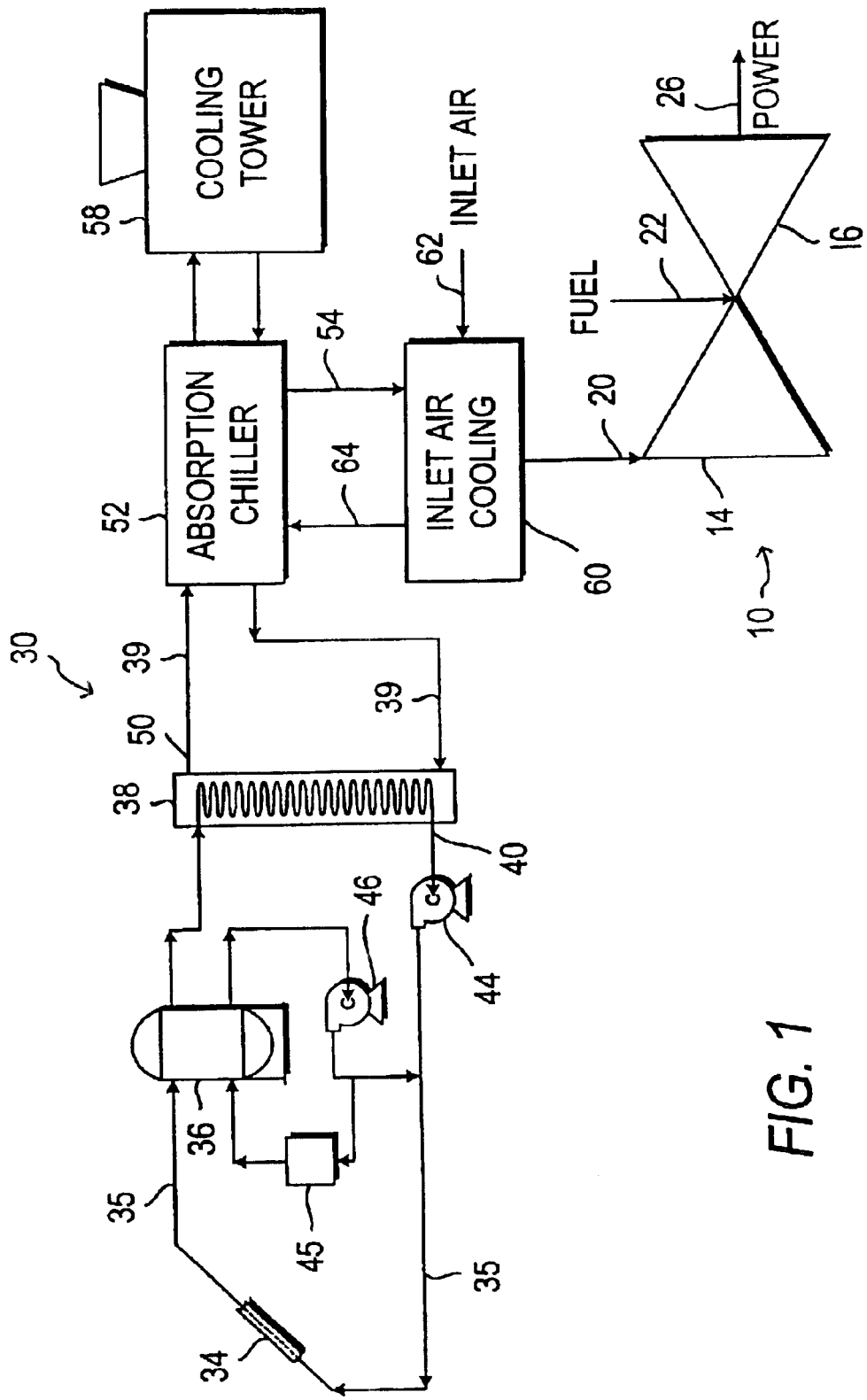
FIG. 1 is a schematic diagram illustrating a combustion turbine power plant according to an embodiment of the present invention employing a solar powered inlet air cooling system.

With reference now to the drawings, FIG. 1 schematically illustrates a combustion turbine power plant in accordance with an embodiment of the invention having a combustion turbine 10 including a compressor 14 and a turbine 16. The compressor 14 has an air inlet 20, and the combustion turbine 10 has a fuel inlet 22 to receive fuel for combustion with air compressed by compressor 14. The resulting combustion gases expand in the turbine 16 to produce power at an output 26.

The inlet air received at inlet 20 is first cooled from ambient temperature by means of a solar-powered air cooling system 30. In FIG. 1, a solar field which serves to collect solar energy in a circulating fluid is illustrated schematically by a parabolic trough collector 34. Other types of solar energy collection devices may be used such as solar panels or flat plate collectors. However, parabolic trough collectors are preferred for this application because they are relatively inexpensive and durable.

In a primary circulation loop 35 of the air cooling system 30, the fluid heated by the solar energy collection devices 34 is supplied to a storage and expansion tank 36 from which the heated fluid is supplied to a low pressure steam heat exchanger 38 for producing steam in a secondary loop 39 of the air cooling system 30 by transfer of heat from the fluid supplied from the tank 36.

The primary loop fluid is recirculated from an outlet 40 of the heat exchanger 38 by means of a pump 44, from which the fluid is resupplied to the parabolic trough collectors 34.

Advantageously, the primary circulation loop of the system 30 operates at low pressure, so that the primary loop employs a liquid having a high boiling point, such as mineral oil or a synthetic heat transfer liquid.

When the solar powered air cooling system 30 is started up in the morning, a start-up loop including a fluid heater 45, such as a gas-fired heater, brings the fluid in the tank 36 up to the operating temperature, as it is recirculated by means of a pump 46. Once the fluid reaches the operating temperature, the heater 45 and pump 46 are shut off. The pump 46 also provides a means for recirculating the fluid from the tank 36 through the collectors 34 while bypassing the heat exchanger 38. The start-up loop may be omitted where heat loss at night does not result in excessive cooling of the fluid or where alternative means are available for start-up heating of the fluid, such as low-level solar radiation.

The heat exchanger 38 produces steam at an outlet 50 at a relatively low pressure, such as 125 PSI, which is supplied to an inlet of a steam driven absorption chiller 52. The absorption chiller 52 utilizes the energy of the steam to cool water which it supplies at an outlet 54. Heat withdrawn from the water by the absorption chiller 52 is rejected to the air by means of a cooling tower 58.

The chilled water supplied at the outlet 54 is supplied to a coolant inlet of an inlet air cooling apparatus 60 which serves to cool air received at an inlet 62 and supply the cooled air to the air inlet 20 of the compressor 14. The water received by the apparatus 60 from the absorption chiller 52 is returned thereto via an outlet 64 of the apparatus 60. In place of absorption chiller 52, other types of cooling apparatus may be employed, such as a steam jet or an air-cooled chiller.

The power plant of FIG. 1 achieves both an unusually high efficiency along with greater power generating capacity than conventional combustion turbine power plants through the use of solar energy to cool inlet air to the combustion turbine 10. The increased density of the inlet air achieved through cooling permits fuel to be injected through the fuel inlet 22 at a greater rate, thus increasing the power output. Cooling the inlet air also serves to reduce the operating temperatures of the gas turbine, so that a greater amount of fuel can be injected into the apparatus while maintaining the operating temperatures at safe levels. Also, since gas turbine parasitic losses increase as a percentage of gross output when the latter decreases, substantially greater efficiency is achieved in the present invention which is able to operate at higher power levels.

Figure 1A:
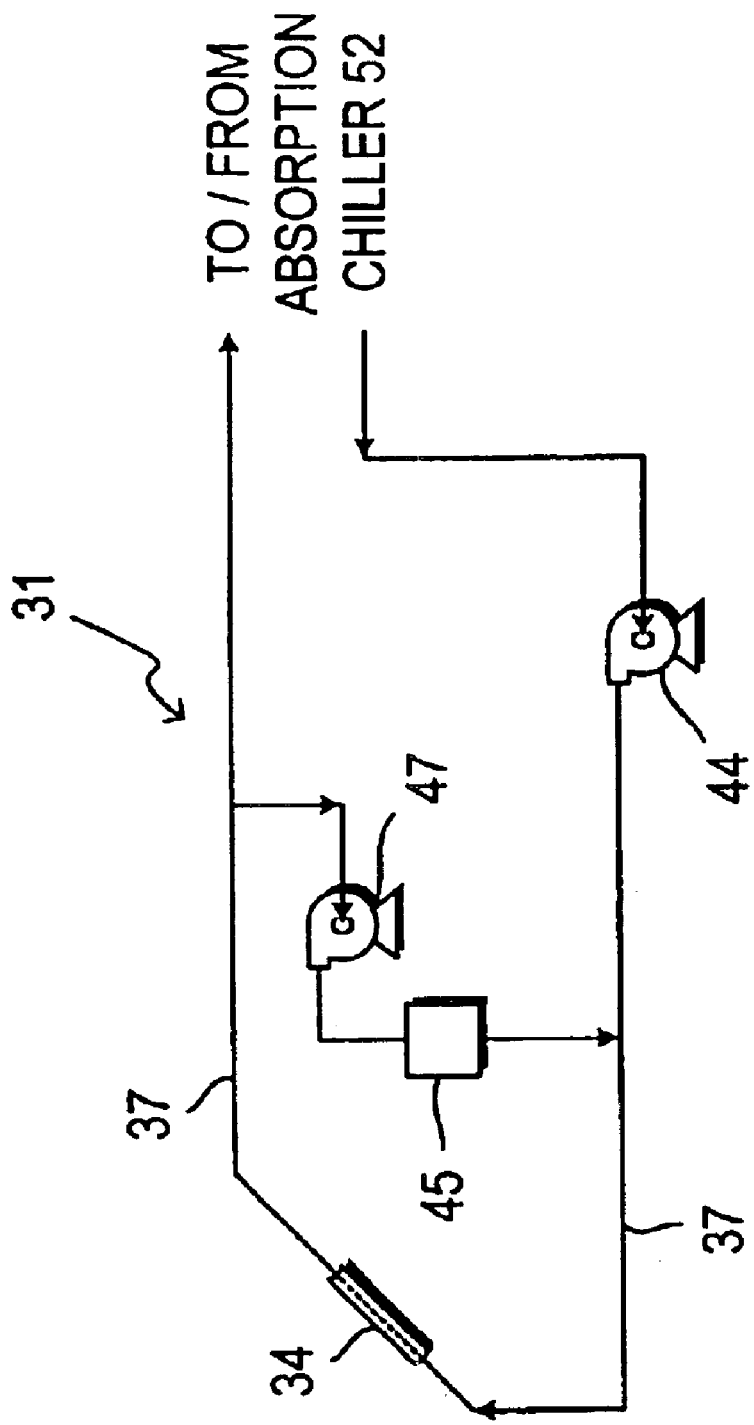
FIG. 1A is a schematic diagram illustrating a modification of the FIG. 1 embodiment.

FIG. 1A illustrates a modification to the embodiment of FIG. 1, wherein the cooling system 30 is replaced by a modified cooling system 31. The modified cooling system 31 supplies heated fluid from the solar field represented by collector 34 via a circulating loop 37 to the absorption chiller 52. The fluid may be, for example, water containing glycol. From the absorption chiller 52 the fluid is recirculated to the solar field by the pump 44. In the alternative, the fluid supplied from the solar field can be directed to a storage means, such as a storage tank (not shown for purposes of simplicity and clarity), from which the fluid is supplied to the absorption chiller 52.

FIG. 1A also illustrates the use of fluid heater 45 and a pump 47 for preheating the fluid to operating temperature, as in the embodiment of FIG. 1. As noted above, the heater 45 and pump 47 may be omitted where fluid preheating is not necessary.

The embodiment of FIG. 1A eliminates the need for heat exchanger 38, as well as the secondary loop 39.

Figure 2:
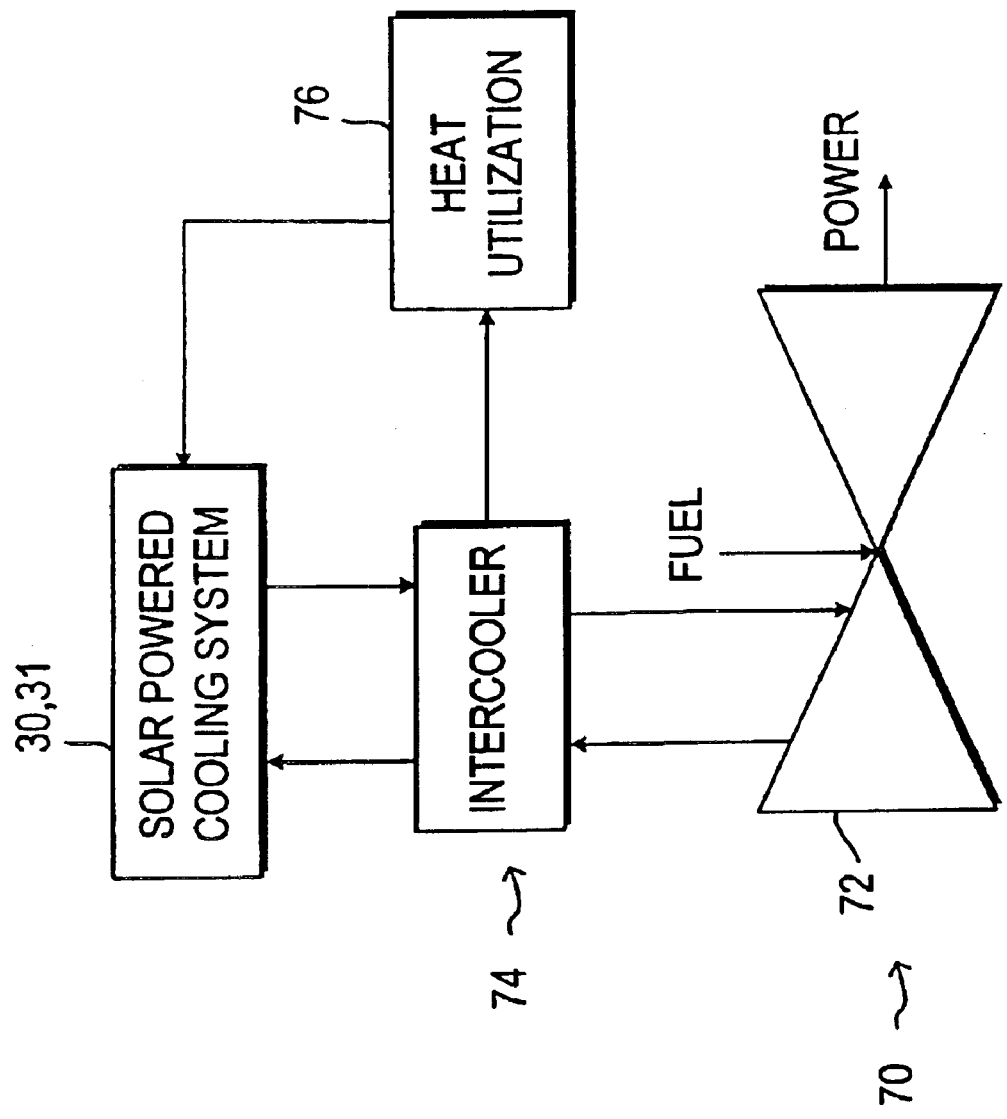
FIG. 2 is a schematic diagram illustrating a modification of the FIG. 1 embodiment.

FIG. 2 schematically illustrates a modification of the systems shown in FIGS. 1 and 1A in which a gas turbine 70 includes a compressor 72 coupled with an intercooler 74 which serves to remove the heat from partially compressed air from the compressor 72. The intercooler 74 receives chilled water from either the solar powered cooling system 30 of FIG. 1 or the system 31 of FIG. 1A for this purpose, and supplies the heat removed from the compressed air to a heat utilization apparatus 76. In one advantageous embodiment the heat utilization apparatus 76 serves to generate steam which is supplied to the cooling system 30 or 31 in order to supplement the production of chilled water by means of solar generated steam.

In certain applications, it is desirable to store the solar energy, for example, in order to operate the air cooling system at night, or at other times when insufficient solar radiation is received by the solar collection field to sustain the ongoing operation of the cooling system 30 or 31. There are several means for providing such a storage capability within the scope of the present invention. In one embodiment, the storage and expansion tank 36 as well as the solar collection field of the system 30 are supplied with a greater capacity than necessary merely to operate the cooling system while solar energy is received. Heat energy thus builds up in the system at such times, so that when insufficient solar radiation is available the heat energy may be drawn down to operate the cooling system. In further embodiments of the invention, chilled water produced by the absorption chiller 52 or other cooling apparatus employed by the cooling system is stored during hours of peak sunlight, preferably as an ice/liquid water storage medium, for subsequent use.

Figure 3:
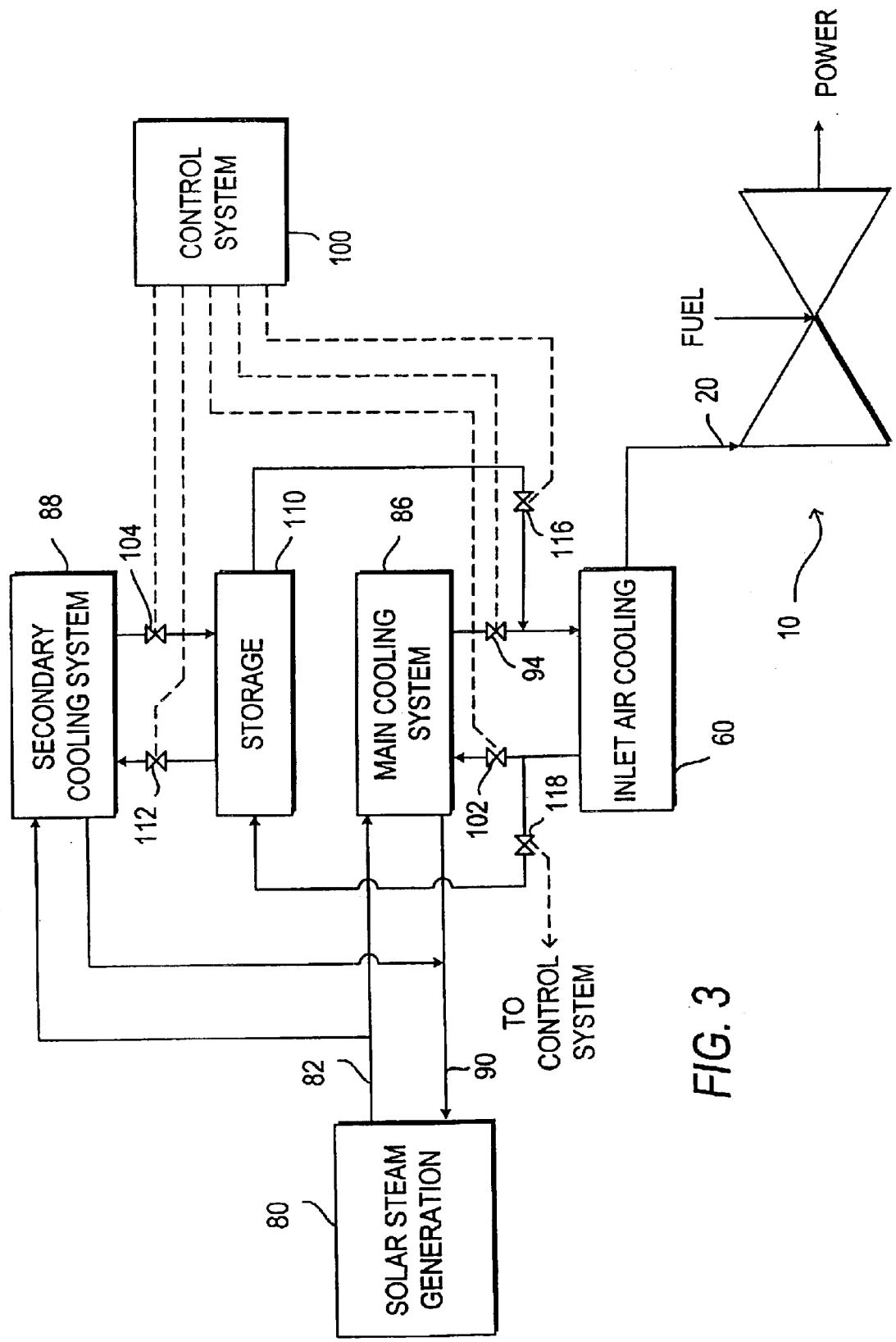
FIG. 3 is a schematic diagram of a further embodiment of a combustion turbine power plant according to the present invention including a solar powered inlet air cooling system incorporating an energy storage capability.

An advantageous embodiment of a combustion turbine power plant supplied with solar energy cooled inlet air and having an energy storage capability is illustrated schematically in FIG. 3. A solar steam generation system 80 serves to produce steam using solar energy and supplies the steam at an outlet 82 both to a main cooling system 86 and a secondary cooling system 88. Cooling systems 86 and 88, as in the case of the absorption chiller 52 of FIG. 1, produce chilled water from the energy supplied in the steam from system 80 and return the steam to an inlet 90 thereof. An outlet of the main cooling system 86 supplies chilled water to the inlet air cooling apparatus 60 through a valve 94 which is controlled by means of a signal supplied from a control system 100. Water is returned to the main cooling system 86 through a return valve 102 also under the control of the control system 100.

The secondary cooling system 88 supplies chilled water from an outlet thereof through a further valve 104 under the control of the control system 100, to a storage facility 110 which stores the solar energy cooled water as an ice/liquid water mixture. Water is returned to the cooling system 88 from the storage facility 110 via a return valve 112 also controlled by the control system 100.

The storage facility 110 may employ a tank, pond, reservoir or other means which serves to store a cooling medium for later use. The cooling medium preferably is water which normally is readily available, has a high specific heat and can be readily stored as ice so that a fluid transfer medium cooled thereby may be supplied at a constant temperature for reliable operation of the inlet air cooling apparatus 60, as described below. The cooling fluid may also be a eutectic salt or brine, and may also be stored in the facility 110 in liquid, solid or liquid/solid state.

An outlet of the storage facility 110 supplies a cooled fluid, such as water, through a valve 116, under the control of the control system 100, to the coolant inlet of the inlet air cooling apparatus 60. The cooling fluid is returned to the storage facility 110 through a valve 118, also under the control of the control system 100.

The control system 100 receives input signals from environmental sensors (not shown for purposes of simplicity and clarity) representing ambient temperature and intensity of solar radiation, together with a signal representing the demand for power from the combustion turbine 10. Based on these signals, the control system 100 serves to control the supply of cooling fluid from either or both of the main cooling system 86 and/or the storage facility 110 to the inlet air cooling apparatus 60 by controlling the valves 94, 102, 116 and 118. The control system 100 also serves to control the supply of cooling fluid from the secondary cooling system 88 to the storage facility 110 by controlling the valves 104 and 112.

During times of relatively intense solar radiation, when the demand for power and ambient temperature permit, cooling fluid is withdrawn from the secondary cooling system 88 through the valve 104 for storage in the facility 110, under the control of the system 100. At times of diminished solar radiation, or when the demand for energy to cool inlet air to the combustion turbine 10 is high, the control system 100 either reduces the flow of cooling fluid to the storage facility 110 by throttling the valve 104 or closes the valve 104, as appropriate. For example, at night when both cooling systems 86 and 88 are not operational, the system 100 closes the valves 104 and 112.

When the intensity of solar radiation is relatively high, the control system 100 opens the valves 94 and 102 to supply cooling fluid from the main cooling system 86 to the apparatus 60, while maintaining the valves 116 and 118 closed, so that energy may be stored simultaneously in the storage facility 110. The system 100 also serves to throttle the valves 94 and 102 when the ambient air temperature is lower so that the demand for inlet air cooling is concomitantly reduced.

At times of reduced solar radiation, for example, in the late afternoon or when skies are overcast, and especially when peak power demand occurs simultaneously, the control system 100 serves to open the valves 116 and 118 either partially or fully, as needed, to supplement the cooling fluid supplied from the main cooling system 86, and simultaneously throttles the valves 94 and 102 to reduce the flow of coolant from the system 86.

It will be appreciated that the system of FIG. 3 provides the ability to supply solar cooled inlet air to the combustion turbine 10 both at times of relatively intense solar radiation and at times of diminished solar radiation, in order to supply peak power demands which do not occur simultaneously with intense sunlight.

Figure 4:
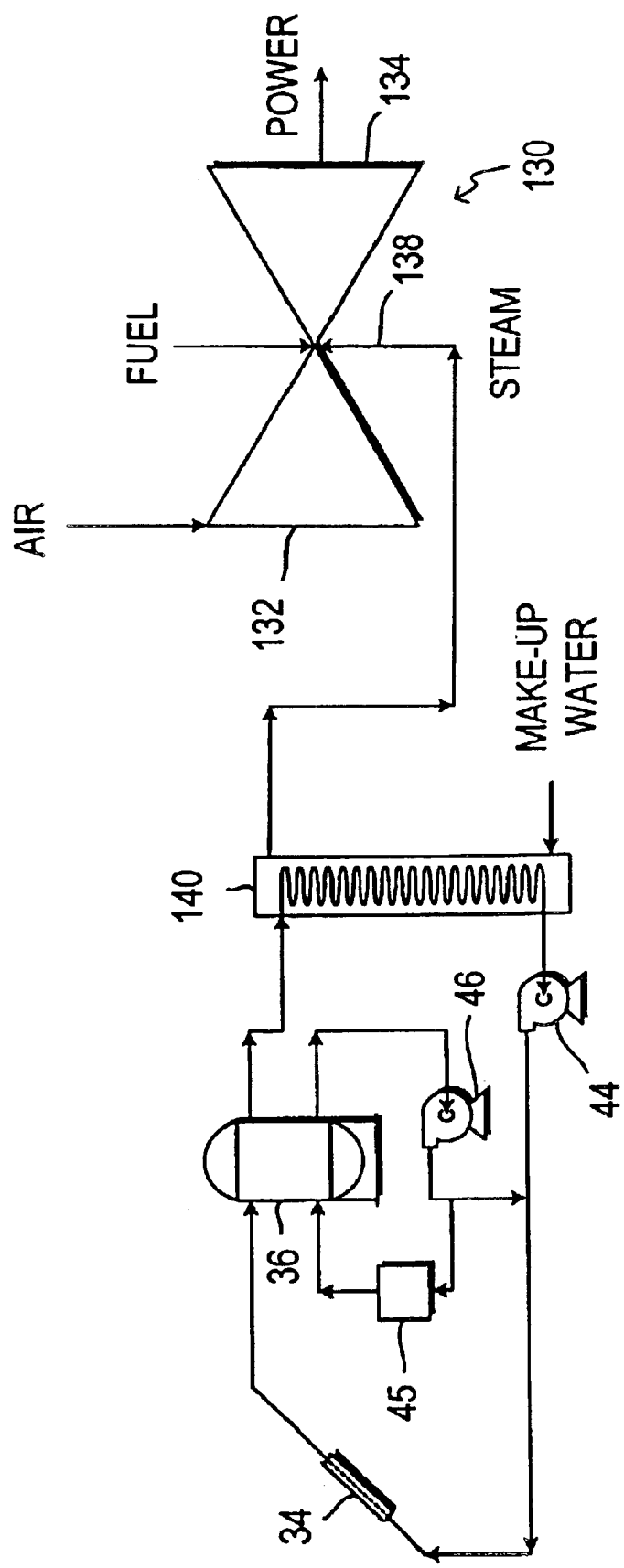
FIG. 4 schematically illustrates an embodiment of a combustion turbine power plant according to an embodiment of the present invention incorporating a solar powered augmenting steam generation system.

FIG. 4 schematically illustrates a combustion turbine power plant in accordance with a further embodiment of the invention having a combustion turbine 130 including a compressor 132 and a turbine 134. In the combustion turbine 130, inlet air compressed by the compressor 132 is mixed with fuel and ignited to supply combustion gases at high temperature and pressure for driving the turbine 134 to produce power.

The combustion turbine 130 is supplied with a steam inlet 138 to receive solar generated steam at high temperature and pressure which is mixed with the combustion gases to assist in driving the turbine 134. By injecting steam at the inlet 138 to be added to the combustion gases, the power-generating capacity of the combustion turbine 130 is increased significantly without the need to proportionately increase fuel usage, thereby improving the overall cost of producing power. Since the steam is produced with the use of solar energy, it is supplied relatively inexpensively, so that the overall efficiency of the system is further improved. The systems of FIGS. 1–4 each serve to enable a combustion turbine to generate considerably more power at a given ambient air temperature than the same would otherwise be capable of producing. The use of such systems, therefore, makes it possible to construct a system having a greater generating capacity without the need to employ a larger gas turbine, thus reducing the necessary capital investment.

In the system of FIG. 4, solar steam generation is accomplished using a modified version of the solar steam generation system of FIG. 1 which incorporates the elements 34, 36, 44, 45 and 46. However, the low pressure steam heat exchanger 38 is replaced by a high pressure superheated steam heat exchanger 140 which serves to produce steam at the high temperatures and pressures required for injecting the steam into the turbine 134. For example, the heat exchanger 140 could be selected to supply steam at 425 PSIG and 500° F.

Figure 5:
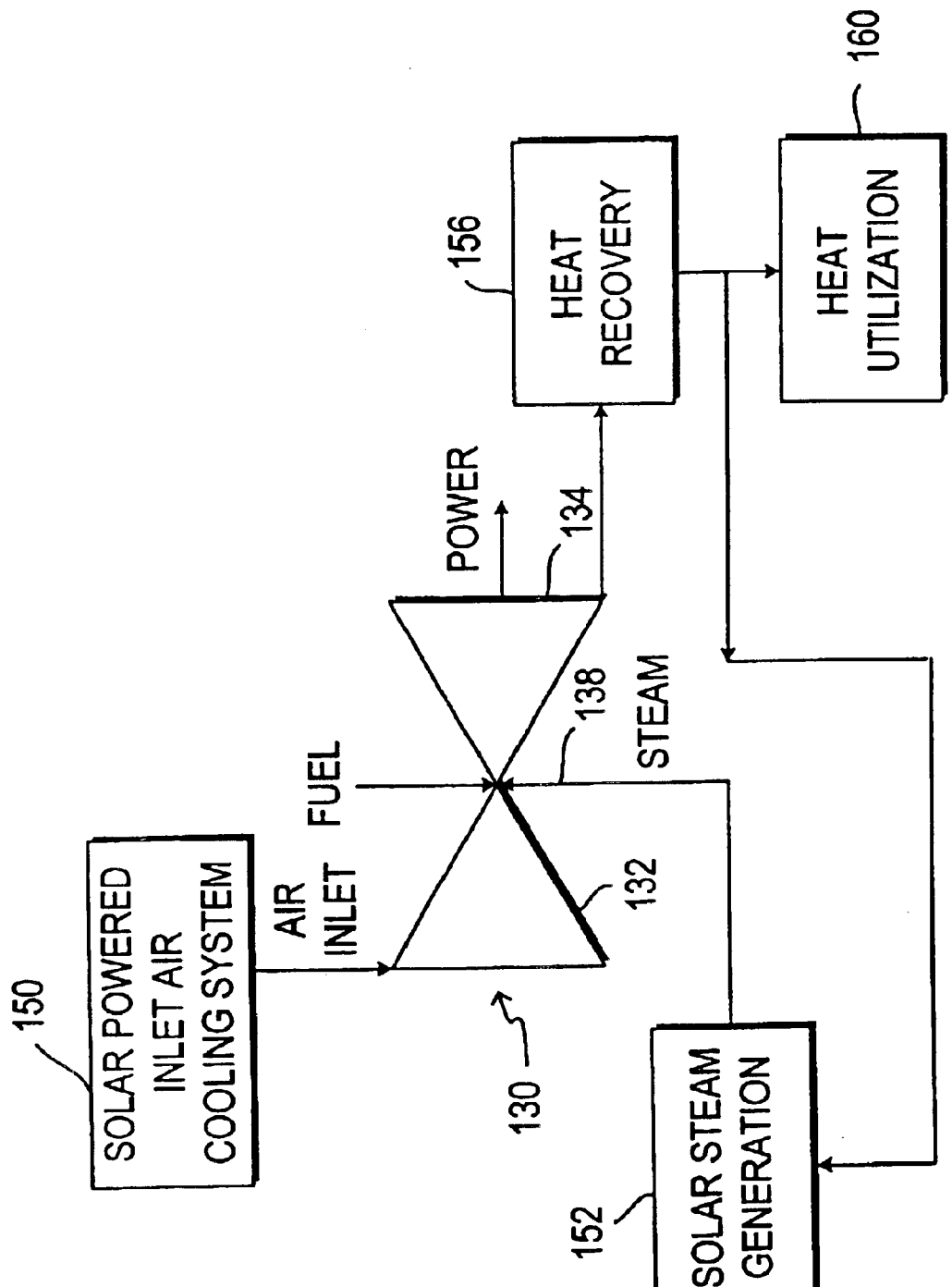
FIG. 5 schematically illustrates a further embodiment of the present invention incorporating both a solar powered inlet air cooling-system and a solar steam generation system.

A system which combines the advantages of the foregoing embodiments is illustrated in FIG. 5, wherein a solar powered inlet air cooling system 150, which could correspond, for example, to the system 30 of FIG. 1, the system 31 of FIG. 1A or the inlet air cooling system as illustrated in FIG. 3, supplies cooled air to the air inlet of compressor 132 of the combustion turbine 130. In addition, a solar steam generation system 152, such as that illustrated in FIG. 4, supplies steam at high pressure and temperature to the inlet 138 of the turbine 134 to augment the power supplied by the combustion gases produced in the combustion turbine 130. The system of FIG. 5, therefore, achieves a combination of the benefits provided by the foregoing embodiments.

In order to improve fuel efficiency further, exhaust gases from the turbine 134 are supplied to the inlet of a heat recovery unit 156 for transfer of its heat energy to an appropriate heat transfer fluid. The heat transfer fluid is supplied by the unit 156 to a heat utilization apparatus 160. The apparatus 160 may constitute a further electric power generation plant, in which case the system of FIG. 5 constitutes a combined cycle system. The device 160 could in the alternative utilize the exhaust heat from the turbine 134 for non-electric generation purposes, for example, for space heating or to augment the solar generated steam utilized in the solar powered inlet air cooling system 150. The heat energy recovered by unit 156 can also be supplied to the solar steam generation system 152 as indicated in FIG. 5 to augment the solar energy utilized thereby.

In certain embodiments the solar powered inlet air cooling system 150 and the solar steam generation system 152 obtain solar energy from a single solar collection field. In other embodiments, two separate fields are employed to achieve greater reliability, with one supplying energy to the system 150 and the other supplying energy to the system 152. In other embodiments both fields supply energy to both of the systems 150 and 152.

Figure 6:
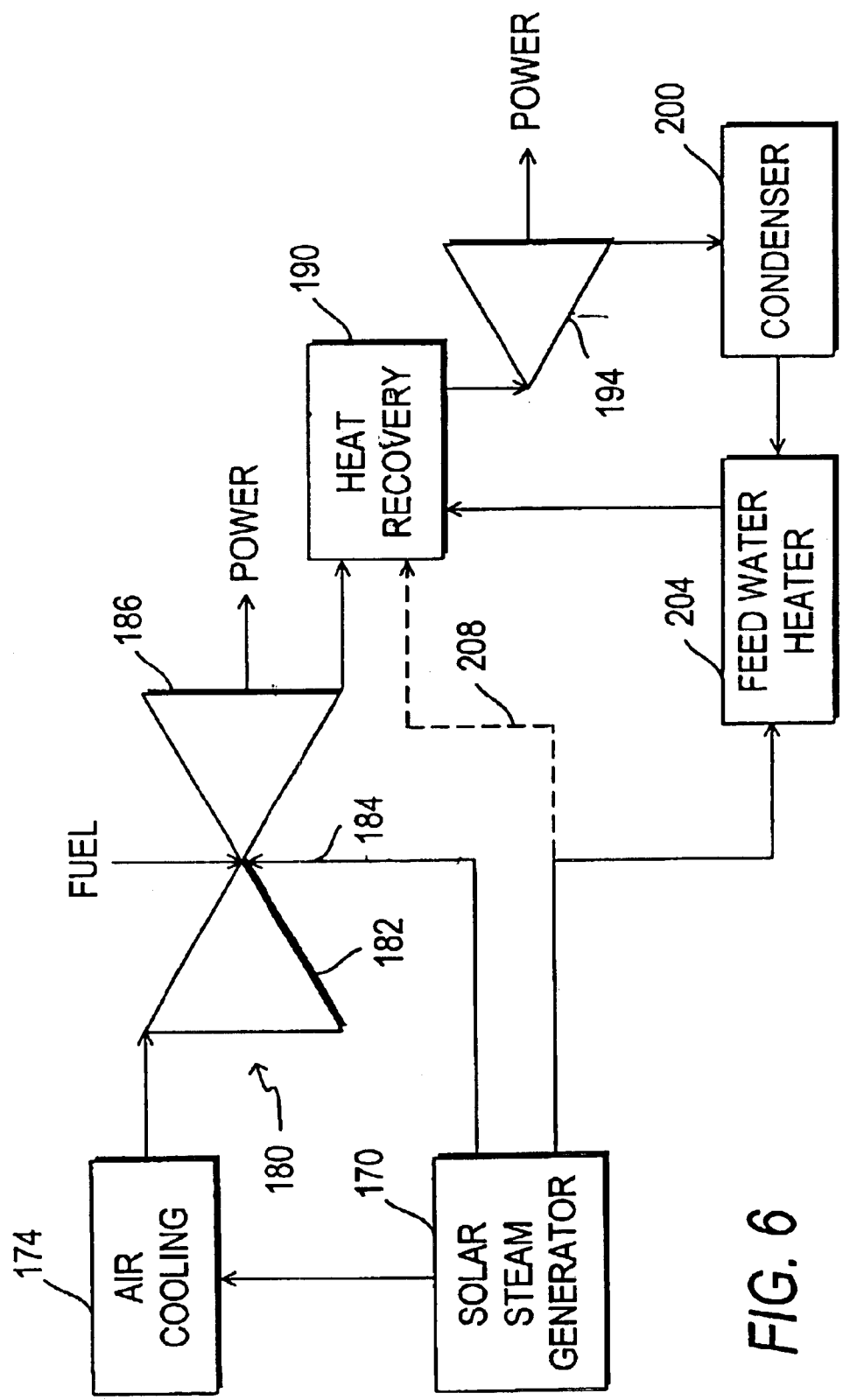
FIG. 6 schematically illustrates yet another embodiment of the present invention in the form of a combined cycle power plant incorporating a solar steam generator.

A further embodiment of a combined cycle system is illustrated in FIG. 6. A solar steam generator 170 supplies solar generated steam to an air cooling unit 174 to provide power thereto for cooling inlet air to a compressor 182 of a combustion turbine 180. In addition, the solar steam generator 170 supplies steam at high pressure and temperature to an inlet 184 of a turbine 186 of the combustion turbine 180 to augment the power supplied by combustion gases, as described hereinabove.

Exhaust gases from the turbine 186 are supplied to an inlet of a heat recovery steam generator 190 which extracts heat energy from the exhaust gases for generating steam to power a Rankine Cycle steam turbine 194. Exhaust steam from the steam turbine 194 is supplied to a condenser 200. The condenser 200 supplies water to an inlet of a deaerating feed water heater 204. The feed water heater 204 also has an inlet to receive steam from the solar steam generator 170 which is used by the feed water heater 204 to preheat the water from condenser 200. The feed water heater 204 supplies preheated water to an inlet of the heat recovery steam generator 190 for steam generation. In the alternative, or in addition, the solar steam generator can supply steam for heating the water to the heat recovery steam generator 190, as indicated by phantom line 208.

The solar steam generator 170 can include one or more solar steam generator units as well as one or more solar collection fields.

Conventional Rankine Cycle generators typically extract steam from the turbine for preheating the feed water. However, the use of steam extracted from the turbine to preheat water reduces the amount of mechanical energy produced by the turbine. The use of steam from the solar steam generator 170 in the FIG. 6 embodiment avoids or reduces the need to extract steam from the turbine for use in preheating the feed water.

In conventional combined-cycle systems, it is a common practice to use steam from a heat recovery steam generator for preheating feed water. Since the exhaust gas from the combustion turbine is supplied at relatively high temperature and pressure, this is likewise a relatively inefficient use of energy. Since the embodiment of FIG. 6 instead uses solar generated steam to preheat the feed water and uses the exhaust gases from the combustion generator to produce steam at high pressure and temperature, the energy obtained from the exhaust gases is used more efficiently.

Although specific embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of operating a combustion turbine power plant, comprising: supplying fuel to a combustion turbine power plant; exposing a medium to solar radiation to produce solar-generated heat energy; using the solar-generated heat energy to operate an air cooling system for cooling air; supplying the cooled air to an air inlet of the power plant; mixing the air received at the air inlet with the fuel to produce an air/fuel mixture; burning the air/fuel mixture to form combustion gas; supplying the combustion gas to a turbine of the power plant; and recovering heat energy from exhaust gas emitted by the turbine.

2. A method of operating a combustion turbine power plant, comprising: supplying fuel to a combustion turbine power plant; exposing a medium to solar radiation to produce solar-generated heat energy; using the solar-generated heat energy to operate an air cooling system for cooling air; supplying the cooled air to an air inlet of the power plant; mixing the air received at the air inlet with the fuel to produce an air/fuel mixture; burning the air/fuel mixture to form combustion gas; supplying the combustion gas to a turbine of the power plant; producing steam from the solar-generated heat energy and supplying the steam to a Rankine Cycle power plant.

3. The method of claim 2, further comprising recovering heat energy from exhaust gas emitted by the turbine and supplying the recovered heat energy to a Rankine Cycle power plant.

4. The method of claim 3, wherein the step of supplying steam to the Rankine Cycle power plant comprises supplying the steam to a feed water heater thereof for preheating feed water, and the step of supplying recovered heat energy comprises supplying the heat energy to a heat recovery steam generator of the Rankine Cycle power plant to produce steam from the preheated feed water.

5. A method of operating a combustion turbine power plant, comprising: supplying fuel to a combustion turbine power plant; receiving solar energy to produce cooled air; supplying the cooled air to an air inlet of the power plant; compressing the cooled air using a compressor; mixing the compressed, cooled air with the fuel to produce an air/fuel mixture; burning the air/fuel mixture to form combustion gas; and supplying the combustion gas to a turbine of the power plant.

6. The method of claim 5, further comprising supplying the cooled air to an inlet of the compressor.

7. A combustion turbine power plant, comprising:

a solar field having a fluid circulating therein to absorb solar energy and an outlet for the circulating fluid;

an air cooling system having an inlet coupled with the outlet of the solar field to receive the fluid from the solar field and an air cooler driven by the solar energy absorbed by the fluid and having an outlet for supplying cooled air; and a gas turbine including a compressor having an air inlet coupled with the outlet of the air cooler to receive the cooled air.

* * * * *